No. 689,142. Patented Dec. 17, 1901.
G. H. TATGE.
THILL COUPLING AND DETACHER.
(Application filed Apr. 23, 1901.)
(No Model.)
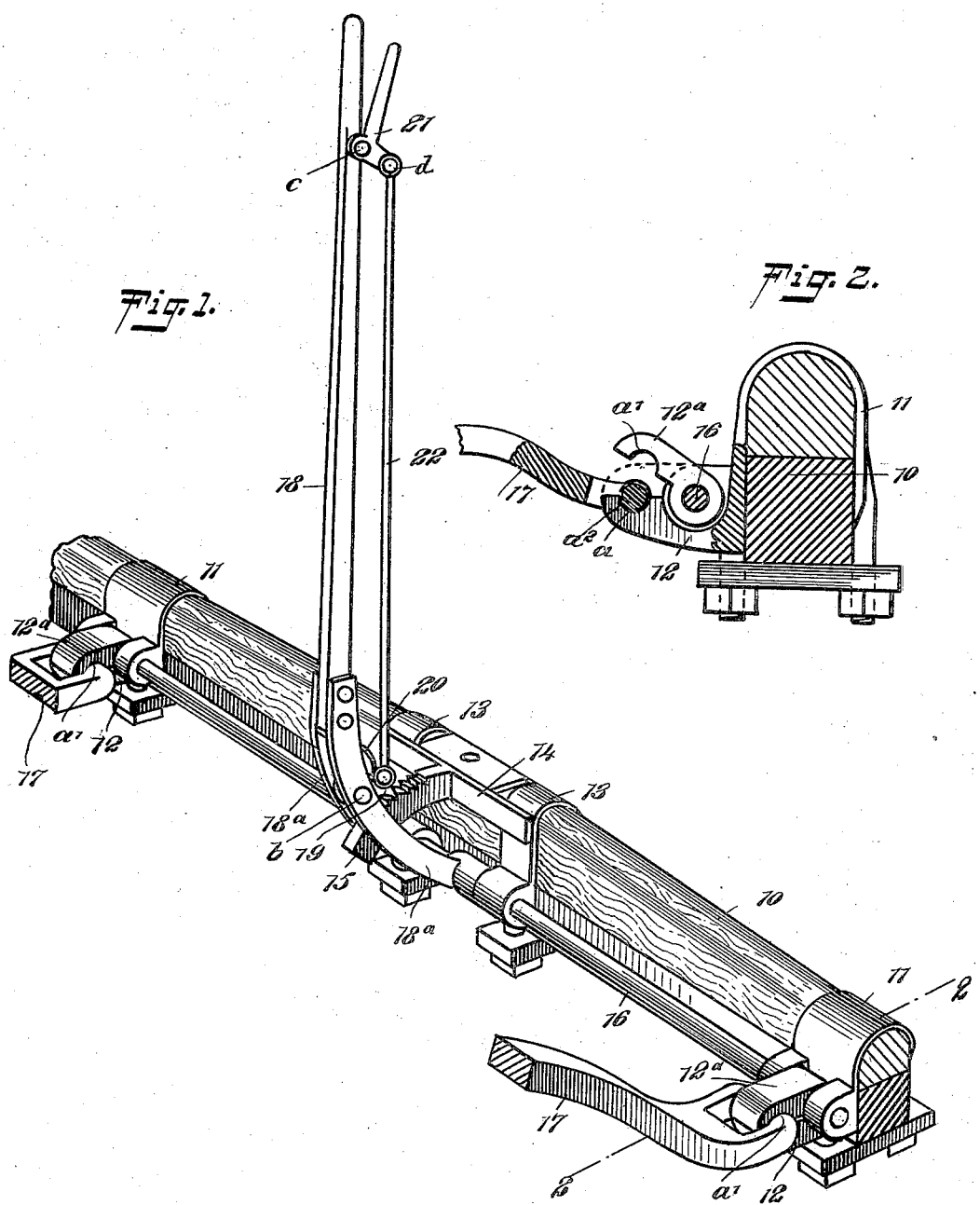
WITNESSES:
William P. Goebel
Wm L. Patton
INVENTOR
George H. Tatge
BY
ATTORNEYS

UNITED STATES PATENT OFFICE.

GEORGE H. TATGE, OF OSMOND, NEBRASKA.

THILL COUPLING AND DETACHER.

SPECIFICATION forming part of Letters Patent No. 689,142, dated December 17, 1901.

Application filed April 23, 1901. Serial No. 57,085. (No model.)

*To all whom it may concern:*

Be it known that I, GEORGE H. TATGE, a citizen of the United States, and a resident of Osmond, in the county of Pierce and State of Nebraska, have invented a new and Improved Thill Coupling and Detacher, of which the following is a full, clear, and exact description.

The object of this invention is to provide a novel simple device which is attachable upon the front axle of a vehicle and is adapted for connecting the thill-irons therewith, so as to permit their instant detachment while the vehicle is in use to prevent possible accident and injury to the occupants of the vehicle.

The invention consists in the novel construction and combination of parts, as is hereinafter described, and defined in the appended claims.

Reference is to be had to the accompanying drawings, forming a part of this specification, in which similar characters of reference indicate corresponding parts in both views.

Figure 1 is a perspective view of the invention applied, and Fig. 2 is a transverse sectional view substantially on the line 2 2 in Fig. 1.

The front axle 10, shown broken away at the ends, is provided with two similar clip-bands 11, positioned thereon at a suitable distance from the longitudinal center of the axle. Adjacent to the clip-bands 11 box-sections 12 extend forwardly from the axle 10, the upper faces of each of these box-sections having a transverse groove or channel $a$ formed thereon near the forward end of the same.

Two clip-bands 13 are secured on the axle 10 at a suitable distance from the bands 11, and upon the front of the clip-bands 13 a cross-bar 14 is secured so as to extend in front of the axle. A toothed segmental rack 15 is projected forward and downward from the cross-bar 14, and may be either formed integral therewith or secured to it.

A rock-shaft 16 extends at the front of the axle 10 and is held to rock by its loose engagement with boxes projected at the front of the clip-bands 11 and 13. Upon the ends of the rock-shaft 16 two similar box-sections $12^a$ are secured, each having in its lower face a transverse channel $a'$.

The channels $a$ and $a'$ conform in pairs, and each pair affords a separable box, wherein the journal $a^2$, formed, as usual, on the end of a thill or tongue iron 17, may be introduced and held when the shaft 16 is adjusted to effect a closure of these boxes, as will be explained.

An upright lever 18, furcated near its lower end, so as to provide two similar spaced limbs $18^a$, having opposite lateral perforations at their free ends, is mounted and secured upon the shaft 16, that is passed through the perforations in the limbs, as indicated in Fig. 1, the limbs $18^a$ being so positioned that the segmental rack 15 projects forwardly between them, disposing the teeth of the rack in such relative position as to adapt them for engagement with a pawl 19, pivoted at $b$ between the limbs $18^a$, and is pressed down by a spring 20.

A handle-lever 21 of angular form is pivoted, as at $c$, upon the upright lever 18 near the upper end thereof, one limb of the lever 21 projecting upwardly and the other limb outwardly from the pivot $c$.

The upper extremity of the link-bar 22 is pivoted upon the outwardly-extended limb of the handle-lever 21, as indicated at $d$, and said link-bar is of suitable length to permit the lower end thereof to be loosely secured upon the pawl 19, and it will be seen that manipulation of the upright member of the handle-lever so as to press it toward the upper end of the lever 18 will rock the pawl 19 away from the rack 15 against stress of the spring 20.

If a horse or team is hitched upon the vehicle-axle 10 by engagement of the irons 17 within the sectional boxes 12 $12^a$, as hereinbefore described, and said boxes are held closed by a proper adjustment of the lever 18 and pawl 19, so as to engage the latter between appropriate teeth of the rack 15, the lever 18 will be disposed at the front of the vehicle so as to be within a convenient distance from the driver of the horse or team.

The thills or tongue of the vehicle will be held securely and will so remain until the draft animal or animals become fractious, endangering the lives or limbs of the occupants of the vehicle. Then the driver may instantly release the tongue or shafts of the vehicle from the axle 10 by lifting the pawl 19 and drawing the lever 18 toward him, which will lift the half-boxes 12ª and disengage the thill-irons 17 in an obvious manner, so that the team or horse may leave the vehicle and the latter, as well as its occupants, be preserved from injury.

Having thus described my invention, I claim as new and desire to secure by Letters Patent—

1. The combination with two looped members of a tongue or thills, and a vehicle-axle, of two box-sections carried by the axle, and each having a transverse groove or channel in its upper face, a shaft held to rock on the axle and carrying similar box-sections having transverse grooves or channels in their lower faces, and means to rock the shaft for the elevation of the box-sections thereon, and release of the looped members that are parts of the tongue or pair of thills.

2. The combination with a vehicle-axle, a shaft held to rock at the front of the axle, a pair of tongue or thill irons having looped ends, and two separable boxes, one half of each box being fixed on the axle and the mating half thereof held to rock with the shaft, said boxes engaging the thill-irons at their looped ends, of a rack carried by the axle, a lever mounted on the shaft to rock the same, a pawl carried by the lever and normally engaging the rack, and means for releasing the pawl.

3. The combination with a vehicle-axle, clip-bands thereon, a shaft held to rock on the clip-bands at the front of the axle, a pair of tongue or thill irons having looped ends, and two separable boxes, one half of each box being fixed on the axle and the mating half thereof held to rock with the shaft, said boxes engaging the thill-irons at their looped ends, of an upright lever furcated at its lower end and secured at the forked ends upon the rockable shaft, a segmental rack having teeth on the upper edge and extending between the limbs of the lever, a pawl pivoted between the limbs of the lever and engaging the teeth of the rack, and means for releasing the pawl to permit a rocking movement of the lever.

In testimony whereof I have signed my name to this specification in the presence of two subscribing witnesses.

GEORGE H. TATGE.

Witnesses:
M. A. NORTON,
D. N. SCHMITZ.